No. 780,138. Patented January 17, 1905.

UNITED STATES PATENT OFFICE.

ERNST STÖFFLER, OF ZURICH, SWITZERLAND.

MANUFACTURE OF PERFORATED BRICKS OR BLOCKS.

SPECIFICATION forming part of Letters Patent No. 780,138, dated January 17, 1905.

Application filed June 16, 1904. Serial No. 212,864.

*To all whom it may concern:*

Be it known that I, ERNST STÖFFLER, a subject of the Emperor of Germany, residing at 72 Forchstrasse, Zurich, in the Republic of Switzerland, have invented new and useful Improvements in the Manufacture of Perforated Bricks or Blocks, of which the following is a specification.

This invention relates to the manufacture of perforated bricks or blocks.

It has heretofore only been possible to manufacture perforated bricks or the like in die-presses by employing bottom dies having movable pins or rods. The pins or rods on the top die can be rigid, since they are withdrawn from the molded article on raising the said die; but those on the bottom die must be movable, as otherwise it is not possible to withdraw the molded article from the die. It has therefore been the practice to arrange for the pins or rods to be withdrawn after the molding or pressing operation is complete or before the bottom die is raised and the brick ejected from the mold. It is not possible to remove the molded brick from the mold-bottom until the pins are withdrawn into the die. Furthermore, the material to be molded easily passes into the guide-holes for the pins, and this, apart from the resulting wear of the parts, frequently so materially hinders the movement of the pins that the regular operation of the machine is prevented.

Now this invention has for its object to obviate these disadvantages, and to this end the raw material is first pressed between smooth top and bottom dies, which after the compression are removed, the material by reason of the pressure and consequent adhesion to the sides of the mold remaining suspended in position. The final compression of the molded bricks is then effected by a pair of dies having rigid pins or rods.

In a suitable way of carrying out the invention the operation takes place in three stages. To this end three presses are arranged around a rotatable table having orifices for the molds, which are open at the top and bottom. The mold is first closed by a smooth bottom die, the corresponding smooth top die being at such a height above the mold that the latter can be filled. The top mold then approaches the lower mold and compresses the material until it adheres to the mold, when the dies are withdrawn, while the table is moved to the second position. The preliminary light compression by the smooth or plain dies possesses the advantage that the air inclosed in the raw material finds time and opportunity to escape before the final form is given to the brick. In the second position the partially-molded article is pressed between dies with rigid pins or rods. After this second-stage compression has been effected the dies, with the pins, recede, and the finished brick, which remains suspended in the mold, is moved by the rotation of the table to the third position. In this position the third stage of the operation takes place—that is to say, the ejection or discharge die operates. The brick can be pressed out of the mold from below upward, in which case it must be lifted off or from above downward, in which case a conveyer-band is advantageously provided for receiving the discharged brick.

In lieu of the rotating table sliding presses can be provided, the various operations forming the complete process being the same as those above described.

In the foregoing description and in the claims I have used the term "perforated" bricks as meaning a brick provided on opposite faces with indentations or recesses, whether these indentations register, so as to form holes passing entirely through the brick, or not.

Having now particularly described and ascertained the nature of my said invention and in what manner the same is to be performed, I declare that what I claim is—

The herein-described method of manufacturing bricks, which consists in first lightly molding the bricks between plain-faced opposing dies in an inclosing mold, whereby the compression of the material causes it to adhere to the mold, and the air inclosed in the material is largely expressed, then withdrawing the plain dies, and finishing the molding of the brick while still held in the mold, with opposing dies having rigid projections for perforating or indenting the brick, then removing both of said finishing and perforating dies, and then forcing the finished brick out of the mold, substantially as described.

ERNST STÖFFLER.

Witnesses:
 S. G. BRUNWALD,
 F. WURST.